INVENTORS
ROLLINS S. CARTER
WILLIAM C. NEELY
JAMES B. PRESTON
BY
ATTORNEY

INVENTORS
ROLLINS S. CARTER
WILLIAM C. NEELY
JAMES B. PRESTON
BY
ATTORNEY

United States Patent Office 3,354,315
Patented Nov. 21, 1967

3,354,315
FLASH PHOTOLYSIS SPECTROSCOPIC SYSTEM
James B. Preston, Raleigh, Rollins S. Carter, Durham, and William C. Neely, Raleigh, N.C., assignors to Monsanto Company, St. Louis, Mo., a corporation of Delaware
Filed Aug. 25, 1964, Ser. No. 391,909
4 Claims. (Cl. 250—217)

This invention relates to spectroscopic analysis and more particularly to methods and systems for spectrochemical determinations based on observations of transient species produced by radiation from a photolyzing flash.

In flash photolysis spectroscopy, transient species are produced in a sample cell by radiation from a photolyzing flash. At a predetermined time later, the light from a spectroflash, i.e. analyzing flash, passes through the sample cell and into a spectrograph to be recorded on a spectroscopic plate. Comparison of the spectra recorded before and after the photolysis flash reveals the absorption spectra of transient species to thereby afford a valuable means of studying intramolecular and intermolecular transfers of energy from one state to another, as well as affording a basis for quantitative determinations. The recording of a series of absorption spectra at various delays between photo- and spectroflashes (as short as 30 micro-seconds) makes possible the study of time changes in the spectrum of the short-lived species.

The conventional flash photolysis systems used in conducting these studies consists essentially of three components:

(1) An irradiation cell containing the system or sample under investigation.
(2) A photolysis flash, i.e. a pulse of very high intensity light for creating a high concentration of transients within the sample contained by the irradiation cell.
(3) An analyzer-detector combination to record the optical absorption spectra of the newly created species.

Two techniques are presently available for recording useful data on short-lived species, namely flash spectroscopy, wherein the full absorption spectrum of a species is recorded at a known time interval following its reaction, and kinetic spectrophotometry, wherein the absorption of the species at a particular wavelength is monitored as the species is produced and reacts.

In kinetic spectrophotometry, as distinguished from the above briefly related flash spectroscopy technique, a constant intensity light source replaces the spectroflash and the spectroscopic plate is replaced by a photomultiplier. As the photoflash is triggered, the absorption of the resulting transient species at a particular wavelength is recorded simultaneously as the light from the constant intensity source passes through the sample, into the spectrograph and onto the photomultiplier elements. The output signal of the photomultiplier conventionally is recorded on an oscilloscope screen from which a photographic record may be made. The triggering of the photoflash and the sweep of the oscilloscope are synchronized; by varying the sweep-rate of the scope, the absorption of the transient species (i.e. production and decay) may be directly observed and recorded over the desired period of time.

Prior to our invention, flash spectroscopy was confronted with two major problems; (1) admittance to the spectroscopic plate of scattered light from the photolysis flash and (2) firing unreliability of the photolysis flash.

The scattering of even a small fraction of the light from a powerful photolyzing lamp into the detector system introduces a serious signal/noise problem in photographic recordings of flash spectroscopy. For example, in typical arrangements having a photolyzing flash of approximately 1000 joules and an analyzing flash of approximately 100 joules, the time-integrated signal/noise ratio seldom exceeds 1:1. The geometry of the usual xenon flash lamp does not permit much improvement by increasing the size (i.e. length) of the analyzing flash tube since the unit brightness remains substantially unchanged. Signal/noise ratios of 10:1 have been obtained in very special instances, through the use of expensive lens arrangements and employing light baffles in the cell compartment. Unfortunately baffles reduce the effectively available quanta by a factor of more than 40 percent. Thus, in the prior art, normal practice has been to place the photolysis flash tube and sample cell at an extended distance from the spectrograph and employ a well collimated analyzing beam to reduce the problem to a tolerable, but still undesirable level.

In kinetic spectrophotometry, the principle problem is saturation of the photomultiplier by scattered light. The signal level from a typical continuous source is about $\frac{1}{100}$ that of the scattered light at its peak. Consequently, a photomultiplier sensitive enough to give a useful signal from the monitoring lamp will be greatly overdriven by the scattered light. The resultant short dead-time of the photomultiplier may, and often does, extend through the time region of interest. Attempts have been made to overcome this by means of high-speed switching circuits designed to control photomultiplier dinode voltages.

The shortcomings of prior art practice are properly emphasized when one realizes that the above referred to signal/noise ratios apply to scattering from nearly ideal spectroscopic samples, i.e. clear solutions or transparent solids. Many samples of interest (i.e. suspensions of solids in liquids) exhibit light scattering many orders of magnitude greater than the ideal samples, rendering their study a practicable impossibility when conducted by prior art techniques.

By the practice of our invention, the scattered light problem has been eliminated and the problem of photolysis flash firing unreliability has been circumvented.

Solution of the first mentioned problem is accomplished by placing the shutter in front of and in close proximity to the aperture of the spectrograph and making the opening of the shutter dependent upon the successful firing of the photolyzing flash. Since the shutter element is constructed of metal foil and is therefore impervious to light when closed, none of the photolyzing light can pass therethrough and into the spectrograph during the short period of time the photoflash tube is energized. In addition, the shutter is designed to have a reproducible opening time and also incorporates means for controlling the delay interval between photoflash firing and shutter opening. The latter control is accomplished by the provision of means to adjust the centerline of the shutter relative to the centerline of the light path extending between the sample cell and the spectrograph. If the two centerlines are not in the same plane, as measured transversely to the light path, the delay time will be increased in that it requires a longer period of time to fully open the shutter to the larger aperture required to permit passage of light when the path of the latter is not aligned with the centerline of the shutter. Another means of increasing shutter delay time is by choice of foil, i.e. its material and dimensions, particularly thickness and width. In general, the heavier the foil, the greater energy required for distortion, thereby resulting in a longer period of time between application of energy and commencement of shutter opening. For a given photoflash tube, there exists a definite period of time over which its flash is detectable, i.e. when such a tube is energized the flash builds up to a maximum peak, then decays to zero, to thereby exhibit a determinable period of brilliance. It is this time period during which opening of the shutter must be prevented in order to avoid admittance of scattered light to the spectrograph.

The problem presented by the unreliability of firing inherent in flash photolysis is overcome by rendering actuation of the shutter mechanism dependent upon successful firing of the photolyzing flash. This is achieved by employing either a phototube or a light-activated silicon controlled rectifier (SCR) as the signal generating means to energize the shutter triggering circuit. In the system illustrated, a light-activated SCR is utilized and is so located as to detect only the firing of the photoflash and does not receive any light generated by the spectroflash; consequently, operation of the latter cannot actuate the shutter. This arrangement is foolproof in that, should the photoflash fail to operate due to electrical or mechanical failure, the shutter will not open and, therefore, no light from the spectroflash, when fired at a predetermined interval later, will enter the spectrograph. Consequently, there is no possibility of light from the photoflash or spectroflash obliterating the spectrum which may have already been established upon the spectroscopic plate.

It therefore becomes an object of our invention to provide a flash photolysis spectroscopic system which precludes admittance of scattered light from a photolyzing flash to the spectroscopic plate and, concomitantly, obviates the adverse effects normally incident to failure of the photolyzing flash to operate.

A further object of this invention is a spectroscopic system wherein shutter operation is rendered dependent upon successful energization of the photolyzing flash.

Still another object is a spectroscopic system wherein the shutter triggering circuit is rendered exclusively light-sensitive to the photolyzing flash.

A still further object is such a spectroscopic system having means for varying the delay interval between energization of the photolyzing flash and actuation of the shutter by varying alignment of the shutter centerline relative to the light path extending between the sample cell and the spectograph.

Yet another object of our invention is a spectroscopic system utilizing a high-speed, electromagnetically actuated shutter element energizable only upon successful operation of the photolyzing flash.

In accordance with our invention, the foregoing and still other objects are attained by the provision of a flash photolysis spectroscopic system utilizing an electromagnetically-actuated shutter mechanism of simple, reliable construction and capable of ultra-high speed, which shutter is synchronized to completely block all light to a detection unit until completion of the photolyzing flash. Further, by the provision of appropriate circuitry, the shutter acts as a fail-safe device in multiple exposure work in the event the photolyzing flash fails to successfully operate. The shutter element, being of metal foil construction, introduces no optically absorbing medium into the system, as distinguished from prior art cell arrangements. When utilized in conjunction with an oscilloscope provided with sweep delay control to trigger the photo- and spectroflashes in precise sequence, such a shutter arrangement has been found to solve the light scatter and flash failure problems to an extent heretofore unattainable.

For a more thorough understanding of our invention, reference shall now be had to a detailed description, taken in conjunction with the accompanying drawings, in which.

Figure 1:
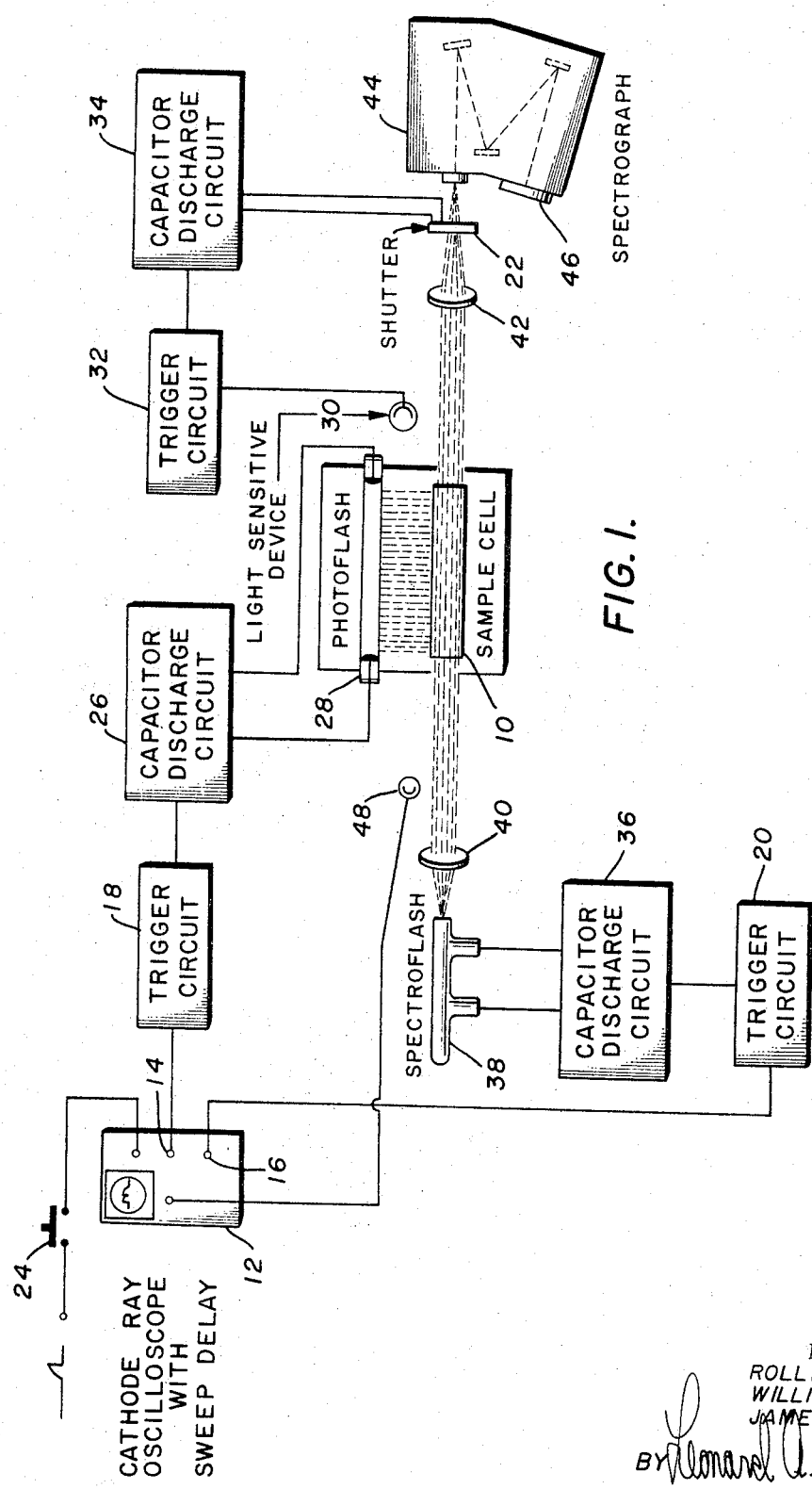
FIG. 1 is a simplified schematic diagram showing the arrangement of the electrical components constituting our system and symbolically indicating the electromagnetically-actuated shutter.

Turning to FIG. 1, there is symbolically indicated an optically transparent sample cell 10 mounted within a suitable enclosure to be in optical alignment with the various flash sources and the spectrograph. An oscilloscope 12 having provision for sweep delay is set for single sweep operation. The oscilloscope gates 14 and 16 may be preset to insure a predetermined and definite time delay between the firing of trigger circuits 18 and 20. The time delay preset at the gates 14 and 16 must be of sufficient duration to insure the excitation of the photolysis flash and the ensuing opening of the electromagnetic shutter 22 so that the proper sequence of events will be executed. A flash button 24 is depressed to initiate the sweep of oscilloscope 12 and, simultaneously, via gate 14, the firing of photoflash trigger circuit 18, thereby energizing a photoflash capacitor discharge circuit 26 and a photoflash tube 28 to irradiate the sample within cell 10. A conventional light sensitive device 30, such as a photocell or light-sensitive silicon controlled rectifier, disposed to be exclusively sensitive to emittance from photoflash 28, becomes energized by a small portion of the intense light emanating therefrom. The light sensitive device, being essentially a switch, is switched on by light striking the junction, thus enabling energization of shutter trigger circuit 32, shutter capacitor discharge circuit 34 (each shown in further detail in FIG. 3) and shutter 22. The shutter 22 has a time delay built into the triggering circuit 32, of at least 30 microseconds, which is the time found necessary to allow for the decay time inherent in the photoflash tube 28. To open the shutter 22 at an earlier interval would permit a portion of the light emitted from the photoflash tube to enter the spectrograph, resulting in obliteration of the desired spectra.

Upon the initiation of the flash signal from gate 14 of oscilloscope 12, the delay mechanism of gate 16 is caused to withhold its signal until the preset time delay has elapsed. When the latter has elapsed, as controlled by the sweep delay control of the oscilloscope, the sweep of the scope fires spectroflash trigger circuit 20, which in turn energizes the spectroflash capacitor discharge circuit 36 and spectroflash 38. The analyzing light from the spectroflash 38 is preferably collimated by lenses 40, 42 both before and after passing through the sample cell 10. After passing through lens 40, sample cell 10 and lens 42, the analyzing light enters the spectrograph 44 through previously opened electromagnetic shutter 22 and on to the spectrographic plate 46, where the absorption spectra of any transient species are recorded.

Provisionally, a second light sensitive device, in the form of a phototube 48, may be utilized to record on the oscilloscope screen the light intensities of the two flashes of light emanating from the photo- and spectroflashes as a function of time, an indication from which the exact delay time between the two flashes may easily be determined. Accordingly, phototube 48 is so disposed that it detects the firing of the two flash sources.

The spectroflash tube 38 and photoflash tube 28 are preferably xenon filled tubes of quartz construction, although other gas-filled tubes are available for these photolysis studies.

Figure 2:
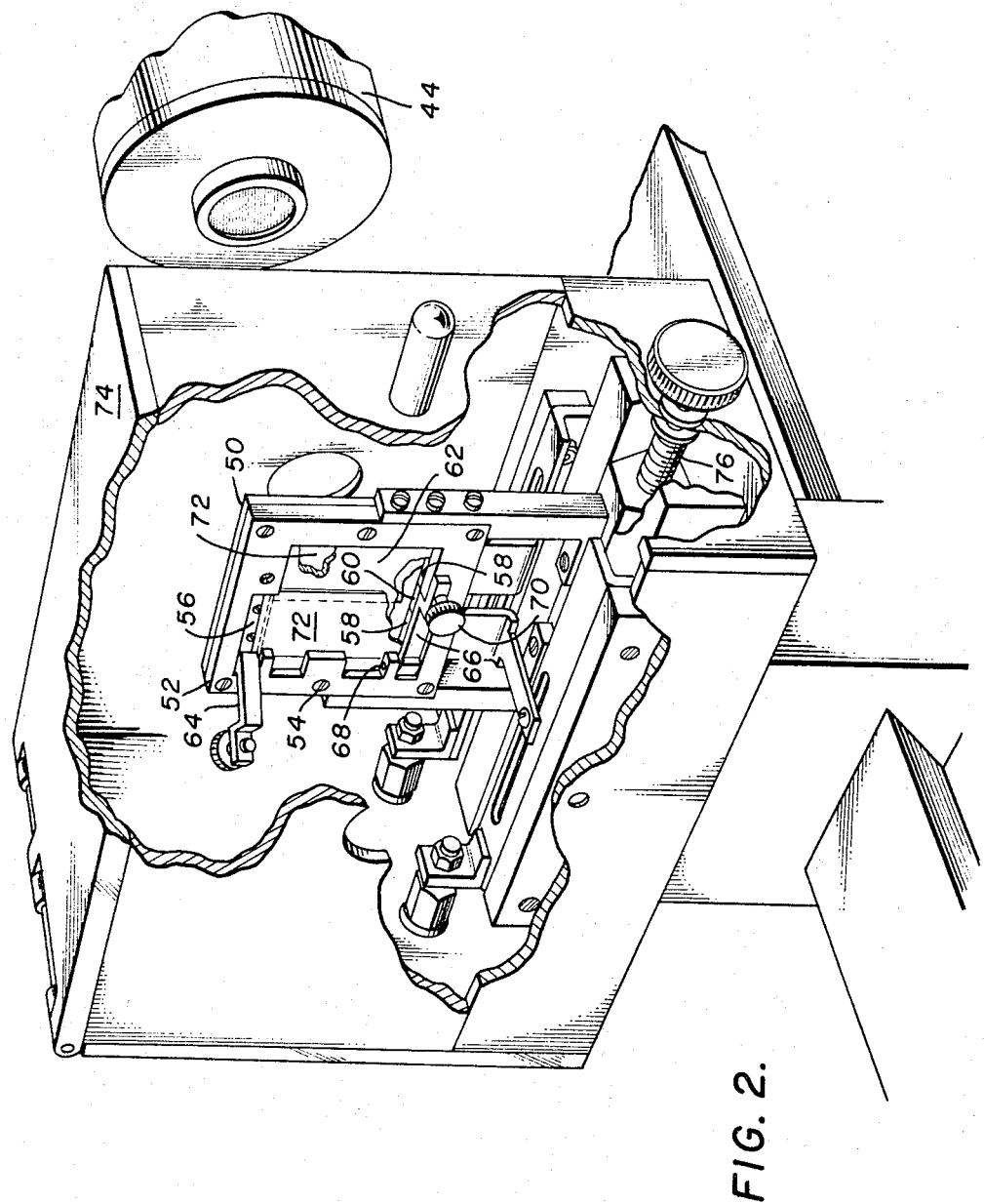
FIG. 2 is a perspective view of the electromagnetic shutter mechanism with portions cut away for clarity and showing the shutter housing and carriage mechanism.

Turning now to the perspective showing of FIG. 2 for a more detailed understanding of the structure comprising the electromagnetic shutter 22, such a shutter is seen to comprise a pair of substantially identical opposed frames 50, 52 of non-metallic construction, e.g. Bakelite, nylon etc., which frames will hereinafter be referred to as back frame 50 and front frame 52. These frames are fastened in face-to-face alignment by means of machine screws 54 to thereby constitute the shutter frame assembly. Mounted to this assembled frame are upper and lower connector bars 56, 58, respectively, which are screw-fastened to the frame member. As seen in FIG. 2, these connector bars are three in number, one upper 56 and two lower 58, with the two lower bars being separated from each other by an insulating spacer 60. These connector bars 56, 58 when bridged by the foil shutter, constitute a series circuit. Optionally, there may be situated within the frame a quartz glass window 62 which facilitates loading of the foil shutters within the frame, but which may be dispensed with in work within optical regions where quartz absorbs. Pairs of hinged upper and lower clamping bars 64, 66, respectively, are mounted on the frame assembly by means of hinge pins 68 and are locked in their closed or clamping position by means of threaded knobs 70 which threadably engage frames 50, 52. The shutter iris comprises, in the preferred embodiment, two sheets of foil, preferably 0.001 inch thick aluminum foil 72, each being clamped along its upper and lower edges between a connector bar and a hinged clamping bar. The twin foil sheets are mounted within the frame so that one sheet lies on one side of the quartz window and the other sheet on the opposite side with an overlap of approximately ⅛ inch in the vicinity of the shutter centerline. This overlap renders the shutter lens light-tight until the action of the electromagnetic forces generated by the high voltage discharge therethrough causes the sheets of foil to be permanently and instantly compressed in such fashion that they are separated to create an aperture therethrough.

The entire shutter assembly just described is mounted within a light-tight shutter housing 74. Within this housing 74 the shutter assembly 22 is mounted upon a traveling screw mechanism 76 which is suitable to travel the shutter assembly transversely of the optical centerline extending between the spectroflash 38 and the spectrograph 44. By this arrangement, one is permitted to adjust the location of the centerline of the foil shutter relative to the optical centerline to thereby afford an additional means of varying the delay time previously discussed. The travel mechanism is conveniently manipulated by an integral knob extension of the travel screw extending through the shutter housing. Preferably, the housing is provided with a hinged cover to permit easy reloading of the aluminum foil after each firing.

Figure 3:
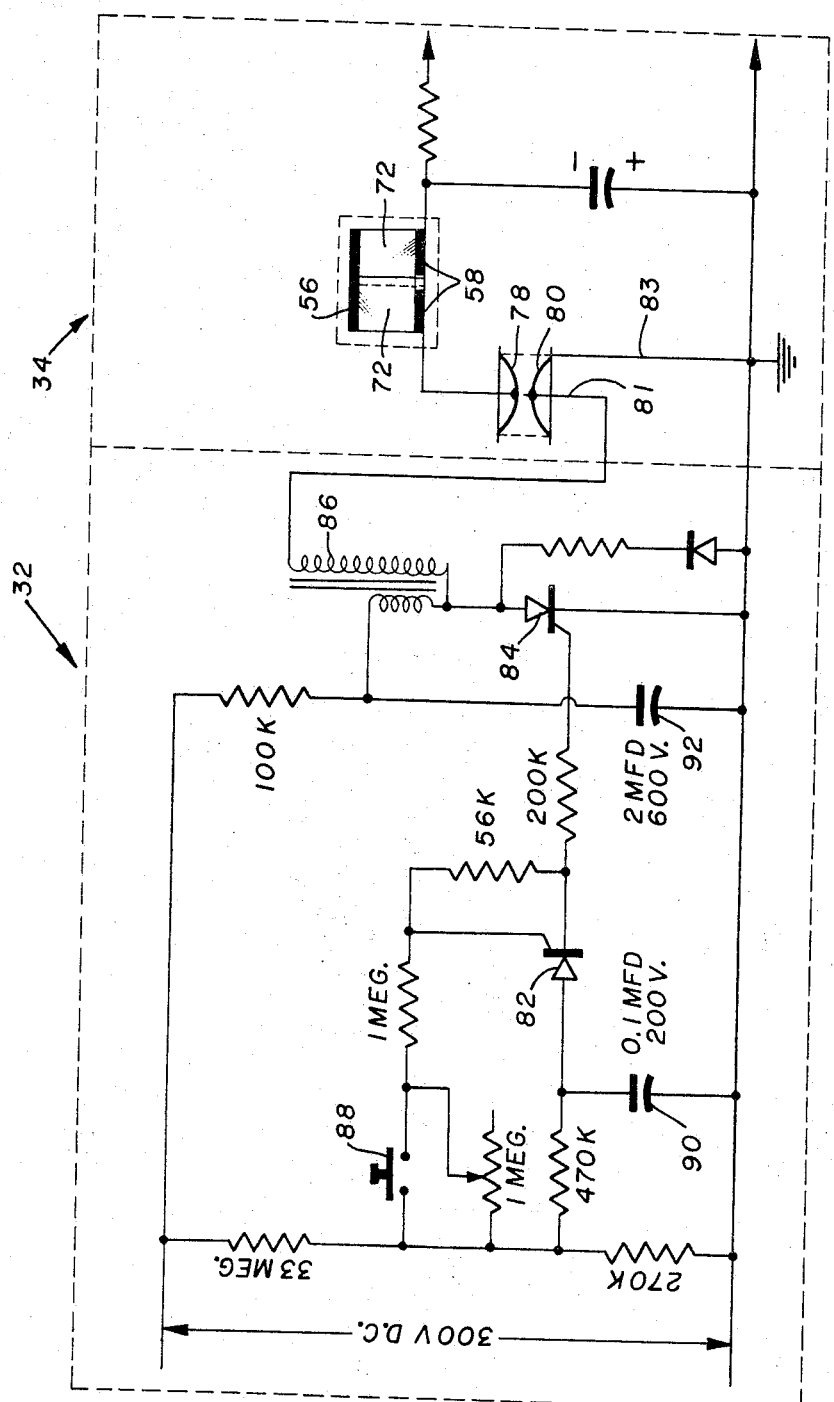
FIG. 3 is a schematic diagram of the light-sensitive shutter triggering and capacitor discharge circuits utilized in firing the shutter to its open position in response to operation of the photolyzing flash.

Reference shall now be had to FIG. 3 for a discussion for the details of the light-sensitive shutter-triggering and capacitor-discharge circuits, generally indicated at 30, 22 and 34 in FIG. 1. In general, this schematic diagram shows the circuit used to trigger a high voltage spark gap, which is the means for the high-speed actuation of the shutter foils to their open position. The spark gap functions as a remotely controlled, high-peak energy switch. A pair of dome-shaped main electrodes 78, 80 defining the spark gap are designed to hold off up to 25 kilovolts. A trigger electrode 81 connected to the secondary of automotive ignition coil 86 is located to extend through a centrally disposed aperture in lower main electrode 80, the latter being at ground potential as indicated at 83. The spark gap is triggered into heavy conduction when a spark is caused to jump across the gap from the trigger electrode 81 to the upper-dome electrode 78. The triggering circuit which provides the spark capable of bridging the gap and opening the shutter at a very precise time in the experimental procedure will now be described.

Since the shutter must operate when, and only when, the photolyzing flash has occurred, a light-actuated triggering circuit has been found most beneficial. This circuit employs two different types of silicon controlled rectifiers (SCR) 82, 84 which switch pulses of current, and an automotive ignition coil 86, which serves to transform the current pulse into a high potential voltage pulse to trigger, via trigger electrode 81, the spark gap. Silicon controlled rectifier 82 is similar to conventional SCR's in that it functions as a gated diode with an anode lead, a cathode and a gate lead. In addition, an aperture or window is provided for admission of light to the junction. Light-activated SCR 82 which may be employed in lieu of a photocell may be gated on either by a small current of a few microamperes into the gate lead, or by the light of the photolyzing flash striking the junction through the window. When light-actuated, the SCR is rendered conducting by the impingement of light upon the material of the junction, changing the electrical resistivity of the junction material, rendering it conductive and thus permitting the passage of electrons through the SCR. In this triggering circuit, the gate lead is used both to manually actuate the trigger, as by a push-button 88, and to adjust the light sensitivity by means of a very small bias current. When the light-activated SCR 82 is gated on, a 0.1 microfarad capacitor 90 is caused to be discharged into the gate of conventional SCR 84, causing it to be gated on. A 2.0 microfarad capacitor 92 charged to approximately 300 volts is discharged through the primary of the automotive ignition coil 86. The resulting high-potential pulse from the secondary of the coil 86 triggers, via trigger electrode 81, the spark gap defined between the dome-shaped main electrodes 78, 80. It will be understood that a large gain in pulse power is achieved by SCR 84.

In the just described triggering circuit, the "rise time" of the pulse, as it is propagated through the several stages, must be kept as short as possible to minimize the delay of the shutter opening and to develop a high potential at the trigger terminal of the spark gap. The polarity of the voltages applied to the spark gap is critical to reliable operation; accordingly, in order that the triggering spark may jump across the gap rather than to the adjacent electrode, the polarity of the voltage pulse applied to the trigger electrode 81 must be opposite to the upper-dome electrode 78. The lower-dome main electrode 80 is maintained at ground potential; a negative potential of 10 kilovolts is applied to the upper-dome electrode 78. A positive-going pulse of voltage is developed by the triggering circuit and applied to the trigger electrode 81 of the spark gap.

It may now be appreciated that there has been herewith described a flash photolysis spectroscopic system which utilizes an electromagnetically-actuated shutter mechanism which is synchronized to completely block all light to a detection unit until completion of a photolyzing flash, as well as affording a fail-safe device in multiple exposure work in the event the photolyzing flash fails to successfully fire. Obviously, numerous modifications and variations of the present invention are possible in the light of the foregoing teachings. It is, therefore, to be understood that, within the scope of the appended claims, the invention may be practiced otherwise than as specifically described herein.

What is claimed is:

1. A flash photolysis spectroscopic system for use in conducting spectrochemical analyses comprising a photoflash means and a spectroflash means, a sweep-delayable oscilloscope interconnecting said photoflash and spectroflash means and operative to fire said spectroflash means at a predetermined interval after firing of said photoflash means, a sample cell disposed to receive light emitted from said photoflash and spectroflash means, a spectrograph optically aligned with said sample cell, shutter means optically interposed between said sample cell and said spectrograph, a shutter firing circuit operative to actuate said shutter means to open position, light responsive means connecting with said circuit and responsive to operation of said photoflash means, whereby said shutter means is actuated only upon successful operation of said photoflash means.

2. A flash photolysis spectroscopic system for use in conducting spectrochemical analyses comprising a sweep delayable oscilloscope, a high intensity photoflash tube, first capacitor discharge circuit means interconnecting said photoflash tube with said oscilloscope to be triggered on commencement of a scope sweep, a spectroflash tube, second capacitor discharge circuit means interconnecting said spectroflash tube with said oscilloscope to be triggered at a predetermined interval after commencement of a scope sweep, a sample cell disposed to receive light emitted from said photoflash and spectroflash tubes, a spectrograph means optically aligned with said sample cell, a shutter mechanism optically interposed between said sample cell and said spectrograph means, a light-sensitive capacitor discharge circuit means connected to said shutter mechanism and operative to actuate said shutter mechanism to open position in response to energization of said photoflash tube, whereby said shutter mechanism is actuated only upon successful operation of said photoflash tube.

3. The spectroscopic system recited in claim 2 wherein said shutter mechanism is further characterized by a pair of spaced electrodes interposed in said light-sensitive capacitor discharge circuit means, at least one metallic foil shutter element bridging said electrodes whereby, upon triggering a discharge through said circuit means, said shutter element is electromagnetically compressed to open position.

4. The spectroscopic system as defined in claim 3 wherein said shutter mechanism is mounted to be adjustable transversely of the optical path extending between said sample cell and said spectrograph, whereby the delay interval between energization of said photoflash tube and actuation of said shutter element to open position is rendered controllable.

References Cited

UNITED STATES PATENTS 2,559,688   7/1951   Touvet _____ 88—15

WALTER STOLWEIN, *Primary Examiner.*